(12) United States Patent
Davey

(10) Patent No.: US 9,770,772 B2
(45) Date of Patent: Sep. 26, 2017

(54) METHOD OF MACHINING A ROTOR WITH VARIABLE-LEAD SCREW

(71) Applicant: PRECISION TECHNOLOGIES GROUP (PTG) LIMITED, Rochdale, Lancashire (GB)

(72) Inventor: Daniel William Davey, Rochdale (GB)

(73) Assignee: Precision Technologies Group (PTG) Limited, Lancashire (GB)

( * ) Notice: Subject to any disclaimer, the term of this patent is extended or adjusted under 35 U.S.C. 154(b) by 0 days.

(21) Appl. No.: 14/651,872

(22) PCT Filed: Dec. 12, 2013

(86) PCT No.: PCT/GB2013/053271
§ 371 (c)(1),
(2) Date: Jun. 12, 2015

(87) PCT Pub. No.: WO2014/091232
PCT Pub. Date: Jun. 19, 2014

(65) Prior Publication Data
US 2015/0336190 A1    Nov. 26, 2015

(30) Foreign Application Priority Data
Dec. 12, 2012  (GB) .................................. 1222387.1

(51) Int. Cl.
*B23F 15/08*      (2006.01)
*F04C 2/16*       (2006.01)
(Continued)

(52) U.S. Cl.
CPC ............ *B23F 15/08* (2013.01); *B24B 19/022* (2013.01); *F04C 2/08* (2013.01); *F04C 2/084* (2013.01);
(Continued)

(58) Field of Classification Search
CPC .......... B23F 15/08; B24B 19/022; F04C 2/08; F04C 2/084; F04C 2/16; F04C 18/08;
(Continued)

(56) References Cited

U.S. PATENT DOCUMENTS 2,701,683 A * 2/1955 Whitfield ............... F04C 18/084
                                                         418/201.3
3,180,229 A * 4/1965 Williams .................. B23C 3/00
                                                         409/66
(Continued)

FOREIGN PATENT DOCUMENTS

CN       101637878       2/2010
CN       101754829       6/2010
(Continued)

OTHER PUBLICATIONS

Sauls et al., "Influence of Manufacturing and Operational Effects on Screw Compressor Rotor Pair Clearances," Dortmund Compressor Conference, VDI, 2010.

*Primary Examiner* — Eileen Morgan
(74) *Attorney, Agent, or Firm* — Terry M. Sanks, Esquire; Beusse Wolter Sanks & Maire, PLLC

(57) ABSTRACT

A method of machining, with a formed tool, a first rotor and a second rotor with mutually complementary meshing threads involves rotating a first workpiece about a longitudinal axis of the workpiece. The tool makes one or more passes along the longitudinal axis of the workpiece as the workpiece rotates so as to remove material, thereby forming the flanks of each helix of the first rotor's thread. The value of at least one of the parameters that collectively define the relative position and relative movement of the workpiece and formed tool is varied during each pass so as to vary the lead of the thread. The above steps are repeated for a second workpiece, thereby forming the second rotor. Adjustments are made to at least one of said parameters during one or (Continued)

more of the passes in order to maintain mutually complementary shapes of the threads of the rotors.

14 Claims, 11 Drawing Sheets

(51) Int. Cl.
- *F04C 18/16* (2006.01)
- *B24B 19/02* (2006.01)
- *F04C 18/08* (2006.01)
- *F04C 2/08* (2006.01)

(52) U.S. Cl.
CPC ............... *F04C 2/16* (2013.01); *F04C 18/08* (2013.01); *F04C 18/084* (2013.01); *F04C 18/16* (2013.01); *F04C 2230/10* (2013.01); *F04C 2240/20* (2013.01); *Y10T 409/107473* (2015.01)

(58) Field of Classification Search
CPC .... F04C 18/084; F04C 18/16; F04C 2230/10; F04C 2240/20; Y10T 409/107473
USPC .......................................... 451/47, 219, 253
See application file for complete search history.

(56) References Cited

U.S. PATENT DOCUMENTS

| | | | | |
|---|---|---|---|---|
| 3,308,695 A * | 3/1967 | Hagerman | ............... | B23B 5/46 82/11 |
| 4,109,362 A * | 8/1978 | Ingalls | .................... | B23F 15/08 29/407.05 |
| 4,527,967 A * | 7/1985 | Ingalls | .................... | F01C 1/084 418/150 |
| 5,115,988 A * | 5/1992 | Tolonen | .................. | B02C 19/22 241/30 |
| 6,027,322 A * | 2/2000 | Ferentinos | ............ | F01C 21/102 418/1 |
| 6,077,150 A | 6/2000 | Jankowski | | |
| 6,491,568 B1 * | 12/2002 | Jankowski | ............ | B24B 53/075 451/253 |
| 7,452,194 B2 * | 11/2008 | Beaven | ................... | F04C 2/165 418/197 |
| 2004/0111884 A1 * | 6/2004 | Steffens | .................. | B23G 1/32 29/888.023 |
| 2004/0258550 A1 * | 12/2004 | Beaven | ................... | F04C 2/165 418/197 |
| 2010/0029183 A1 * | 2/2010 | Heyder | ................... | B23F 15/08 451/47 |

FOREIGN PATENT DOCUMENTS

| | | |
|---|---|---|
| DE | 2157412 | 5/1973 |
| DE | 19806608 | 9/1999 |
| DE | 10 2008 035 525 | 12/2009 |
| JP | H10311288 | 11/1998 |
| WO | 2011096274 | 8/2011 |
| WO | 2012100307 | 8/2012 |

* cited by examiner

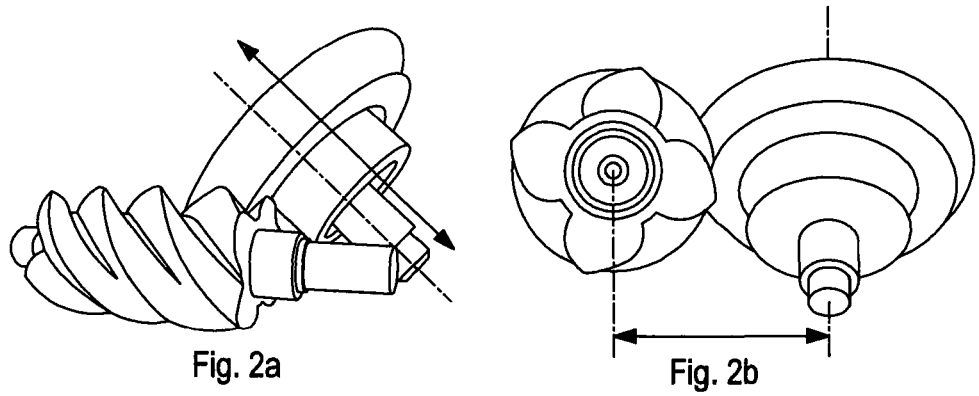
Fig. 2a        Fig. 2b
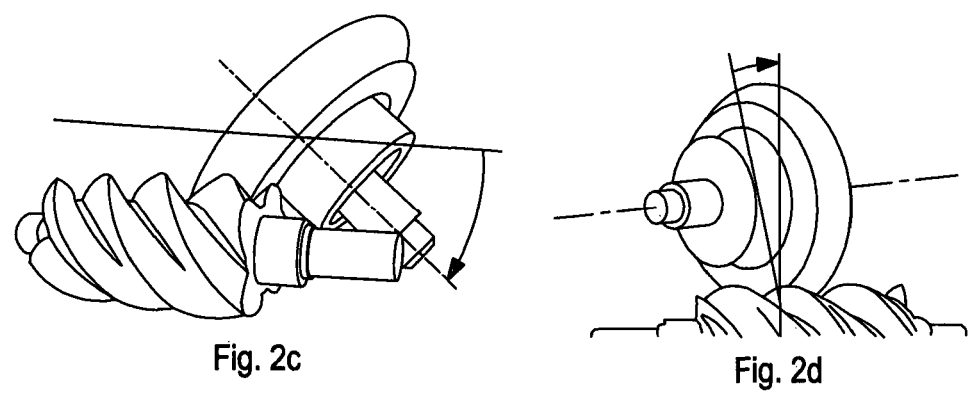
Fig. 2c        Fig. 2d
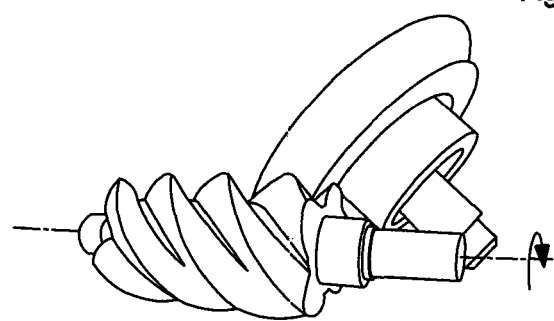
Fig. 2e
Fig. 2

METHOD OF MACHINING A ROTOR WITH VARIABLE-LEAD SCREW

The present invention relates to a method of machining a rotor with variable-lead screw thread. The invention has particular, but not exclusive, application to the machining of variable-lead screw helical rotors of the kind that are used in variable-lead screw pumps.

A typical variable-lead screw pump has two rotors received within a casing. Each rotor has a screw thread of variable lead, which is meshed with the screw thread of the other rotor. To pump a compressible fluid the rotors are counter rotated, which causes pockets of fluid to become trapped between the threads of the rotors before being forced along the length of the rotor from the input end to the output end of the pump. The lead of the thread decreases along the rotor towards the output end, which causes the fluid to be progressively compressed before it is released from the pump. In this manner, the pump operates as a compressor.

The thread of a variable-lead screw pump rotor takes the form of one or more helixes encircling a central cylinder. In the case of a thread with a single start, the entire thread is formed by a single helix. In this case, the lead of the thread (the axial length described by the screw during one complete 360° revolution around the rotor) will be the same as its pitch (the axial length between the crests of two adjacent turns of the thread). In the case of a thread with two or more starts, the thread is formed by two or more helixes, in which case the lead of the thread will be a multiple of its pitch.

Variable-lead screw pump rotors are conventionally manufactured by making multiple passes of a simple tool, such as by turning. One or more machining parameters are varied during each pass in order to vary the lead of the screw thread produced. Such methods tend to remove material at a relatively slow rate and can produce rotors with a faceted or uneven surface. In addition, programming a CNC machine to make the numerous complex passes of the tool that are required may be computationally complex and therefore error-prone or time-consuming.

While varying one or more machining parameters during each pass of the tool is necessary in order to produce a thread of variable lead, a side-effect of this (especially when using a formed tool) is that the cross-sectional shape of the resulting thread can deviate slightly. This can, in turn, decrease the precision with which two such rotors can mesh.

It is one object of the present invention to mitigate or obviate at least one or the aforesaid disadvantages, and/or to provide an improved or alternative method of machining a first rotor and a second rotor with mutually complementary meshing threads, and/or to provide an improved or alternative method of machining a rotor with variable lead.

According to a first aspect of the present invention there is provided a method of machining, with a formed tool, a first rotor and a second rotor with mutually complementary meshing threads, the method comprising: rotating a first workpiece about a longitudinal axis of the workpiece; making one or more passes of the formed tool along the longitudinal axis of the workpiece as the workpiece rotates so as to remove material, thereby forming the flanks of each helix of the first rotor's thread, the value of at least one of the parameters that collectively define the relative position and relative movement of the workpiece and formed tool being varied during each pass so as to vary the lead of the thread; and repeating the above steps for a second workpiece, thereby forming the second rotor, wherein adjustments are made to at least one of said parameters during one or more of the passes in order to maintain mutually complementary shapes of the threads of the rotors.

As it uses a formed tool to machine the rotors, the above method may provide a method of machining a rotor which is advantageously quick (and therefore cheap) in comparison to conventional means of manufacture. In addition, the above method may allow rotors to be machined with a superior surface finish, and may be advantageously simple to implement using CNC machinery. In addition, the above method may produce pairs of rotors which, when meshed, exhibit increased precision of the clearance therebetween.

A formed tool is a tool that is shaped in order to impart a specific profile to a workpiece, rather than a simple tool where it is the motion of the tool that defines the profile imparted.

Where the thread of the rotor has a single start, opposing flanks may be formed simultaneously by one or more passes of the formed tool. Alternatively, each flank may be formed individually by one or more passes of the formed tool.

Where the thread of the rotor has multiple starts, opposing flanks of adjacent helixes may be formed simultaneously by one or more passes of the formed tool. Alternatively, each flank of each helix may be formed individually by one or more passes of the formed tool.

The adjustments may include one or more adjustments to the speed of rotation of the workpiece and/or the spindle angle of the formed tool and/or the centre distance between the workpiece and the formed tool and/or the approach angle of the formed tool and/or the axial position of the formed tool in a direction along its rotational axis. It will be appreciated that the relative position or angle of the tool to the workpiece may be adjusted by moving one of the tool and the workpiece or both.

In one embodiment of the first aspect of the invention the adjustments made during each pass are made according to a global adjustment distribution, each global adjustment distribution being determined in advance by: theoretically calculating the clearance distribution that would be produced by counter-rotating a hypothetical pair of meshed first and second rotors of the shape that would be produced by machining them using the method of the first aspect of the invention without any adjustments being made, at a plurality of locations along the longitudinal axes of the meshed rotors; deriving a location-specific adjustment set for each of said locations, each location-specific adjustment set comprising one or more parameter adjustments which would cause the clearance distribution at that location to be maintained within a predetermined range of values; and collating the adjustments to each parameter according to the location-specific adjustment sets.

In the above embodiment, the collated adjustments may include adjustments interpolated at points between said locations.

In the above embodiment each location-specific adjustment set may be derived by: determining the effect that an arbitrary adjustment of each parameter individually would have on the clearance distribution at that location; and determining a combination of adjustments, and the necessary magnitudes of those adjustments, which would maintain the clearance distribution within a predetermined range of values. The derivation of the location-specific adjustment sets may be performed using human judgement, or by utilising a suitable mathematical or computer-implemented algorithm.

In the above embodiment said locations may be distributed evenly or unevenly along the portions of the rotors that mesh with each other.

In the above embodiment the global adjustment distribution may be calculated using a computerised model of the hypothetical rotors of the shape that would be produced by machining them using the method of the first aspect of the invention but without any adjustments being made. In this case, the location-specific adjustment sets may be calculated by manipulating said computerised model.

According to a second aspect of the invention there is provided a method of producing a rotor with variable-lead screw by machining a workpiece using a formed tool, the method comprising: rotating the workpiece about a longitudinal axis of the workpiece; and making at least one pass of the formed tool along the longitudinal axis of the workpiece as the workpiece rotates so as to remove material, each pass forming at least one flank of at least one helix of the rotor's thread, the value of at least one of the parameters that collectively define the relative position and relative movement of the workpiece and formed tool being varied during each pass so as to vary the lead of the thread produced by the at least one pass.

As it uses a formed tool to machine the rotors, and since each flank of the thread of the rotor is formed in a single pass of the tool, the above method may provide a method of machining a rotor which is advantageously quick (and therefore cheap) in comparison to conventional means of manufacture. In addition, the above method may allow rotors to be machined with a superior surface finish, and may be advantageously simple to implement using CNC machinery.

Where the thread of the rotor has a single start, both flanks of the helix may be formed simultaneously by a single pass. Alternatively, each flank may be formed individually by a separate pass of the formed tool.

Where the thread of the rotor has multiple starts, opposing flanks of adjacent helixes may be formed simultaneously by a single pass of the formed tool. Alternatively, each flank of each helix may be formed individually by separate passes of the formed tool.

The parameter of the axial feed rate of the tool may be varied during one or more passes.

Other parameters may be varied individually or in combination with others during the, or each, pass such as, for example, the spindle (head) angle of the tool relative to the workpiece, the speed of rotation of the workpiece and/or the tool, the approach angle of the formed tool, and the centre distance between the workpiece and the formed tool.

In any applicable aspect of the invention the formed tool may be a grinding wheel.

According to a third aspect of the invention there is provided computer program comprising computer readable instructions configured to cause a machining apparatus to carry out a method according to the first or second aspect of the invention.

Utilisation of a computer program may provide a time-efficient method of carrying out the necessary modelling or calculations, and/or improve the speed or precision of the machining process.

According to a fourth aspect of the invention there is provided a computer readable medium carrying a computer program according to the third aspect of the invention.

Carrying the computer program on a computer readable medium may allow the program to be transferred onto one or more pieces of apparatus capable of implementing the program with advantageous speed and/or data integrity.

According to a fifth aspect of the invention there is provided a computer-controlled apparatus for producing a rotor with variable-lead screw by machining a workpiece using a formed tool, the apparatus comprising: a memory storing processor readable instructions; and a processor arranged to read and execute instructions stored in said memory, wherein said processor readable instructions comprise instructions arranged to control the apparatus to carry out a method according to the first or second aspect of the invention.

Utilising computer control may improve the precision and/or speed of the machining process.

A specific embodiment of the present invention will now be described, by way of example only, with reference to the accompanying drawings in which:

FIGS. 2a-2e are diagrams illustrating a number of machining parameters of the present invention;

Figure 1:
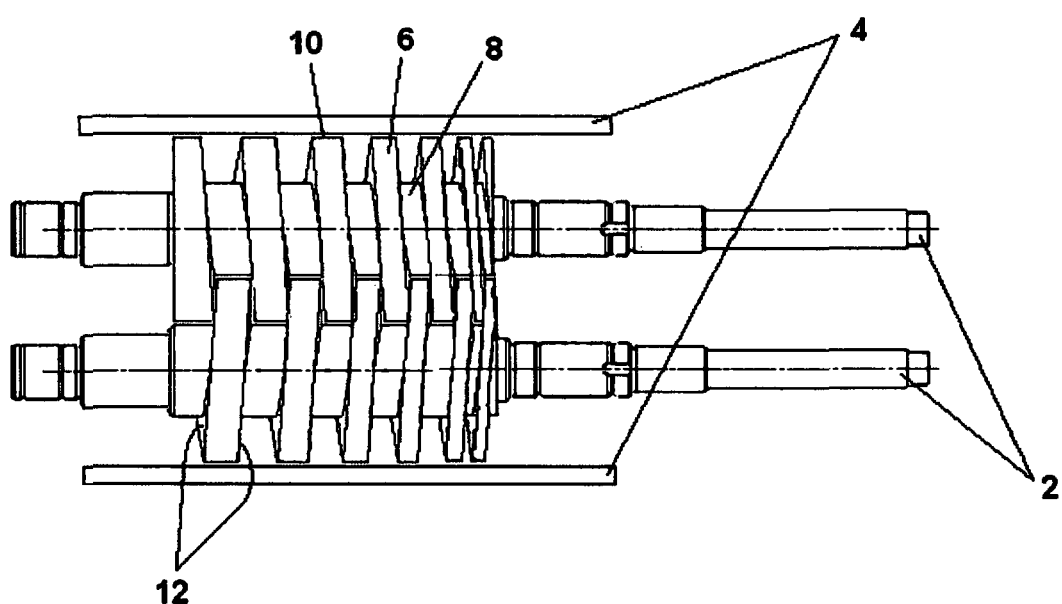
FIG. 1 is a simplified plan view of a variable-lead screw pump manufactured in accordance with the present invention.

Referring now to FIG. 1 of the drawings, the pump has two rotors 2, arranged for counter-rotation in a casing 4. Each rotor has a screw thread 6 of variable lead, formed by one or more helixes disposed co-axially around a centre cylinder 8. The screw threads 6 of the two rotors are meshed (however the rotors are not necessarily drivingly engaged through the threads). While the rotors are commonly mirror images of each other, this is not a requirement and in some pumps the two rotors are markedly different. There is a very tight clearance (for example around 100 μm) between the casing 4 and the outermost surface 10 of the thread 6 of the rotors 2, so as to prevent significant fluid leakage therebetween. There is a similar clearance between the outermost surface 10 of the thread of one rotor 2 and the surface of the centre cylinder 8 of the other rotor, and the flanks 12 of the threads of the two rotors. Again, this is to mitigate fluid leakage through the pump. While a tight clearance of around 100 μm is preferable, the surfaces in question should not touch. To drive the pump, the rotors 2 are counter rotated about their longitudinal axes. This traps pockets of fluid in the input end (the left hand side from the perspective of FIG. 1) between the coils of the threads 6 of the rotors 2. As the rotors 2 continue to rotate, the pockets of fluid are transported along them. As the pockets of fluid move along the rotors 2 the lead of the thread 6, and therefore the space between flanks 12 of the thread, decreases. This progressively compresses the fluid before it is released from the rotor at the output end (the right hand side in FIG. 1) of the pump.

To machine a rotor with a variable lead (such as the kind that may be used in a variable-lead screw pump) using the method of this embodiment of the invention, a helical groove of variable lead is machined into a cylindrical workpiece using a formed tool. In this embodiment, the formed tool is a grinding wheel and the thread of the rotor is a single-start thread (as is commonplace in variable lead rotors). After starting the workpiece rotating about its longitudinal axis, a first series of passes of the grinding wheel is made along the length of the workpiece. This produces a helical groove which defines one flank of the helix of the rotor's thread. A second series of passes of the grinding wheel is then made, widening the groove and defining the other flank of the helix. The thread is then completed.

FIG. 2 illustrates a number of the machining parameters that collectively define the relative position and relative movement of the workpiece and formed tool. However, in other embodiments other parameters which contribute to defining the relative positions/and or movements of the workpiece and the grinding wheel may be considered. These are shown in relation to a workpiece that does not have a variable lead but are sufficient to illustrate the nature of the adjustment. FIG. 2a illustrates the axial movement of the cutting tool, that is to say the speed (and direction) of the movement of the grinding wheel in a direction parallel to its axis of rotation. FIG. 2b shows the centre distance, which is the radial distance from the longitudinal axis of the workpiece to the central point of the tool. FIG. 2c illustrates the spindle angle (also known as the head angle) of the tool, the angle that the rotational axis of the tool makes with the longitudinal axis of the workpiece when both are projected onto a plane perpendicular to the shortest line joining the axis of the workpiece and the central point of the tool. FIG. 2d shows the approach angle of the tool, the angle that the longitudinal axis of the workpiece makes with a projection of the rotational axis of the tool onto a plane containing the longitudinal axis of the workpiece and the central point of the tool. FIG. 2e illustrates the work rotation, the angular velocity of the workpiece about its longitudinal axis.

It will be appreciated that these parameters may be varied by moving one or both of the tool and the workpiece.

Figure 3:
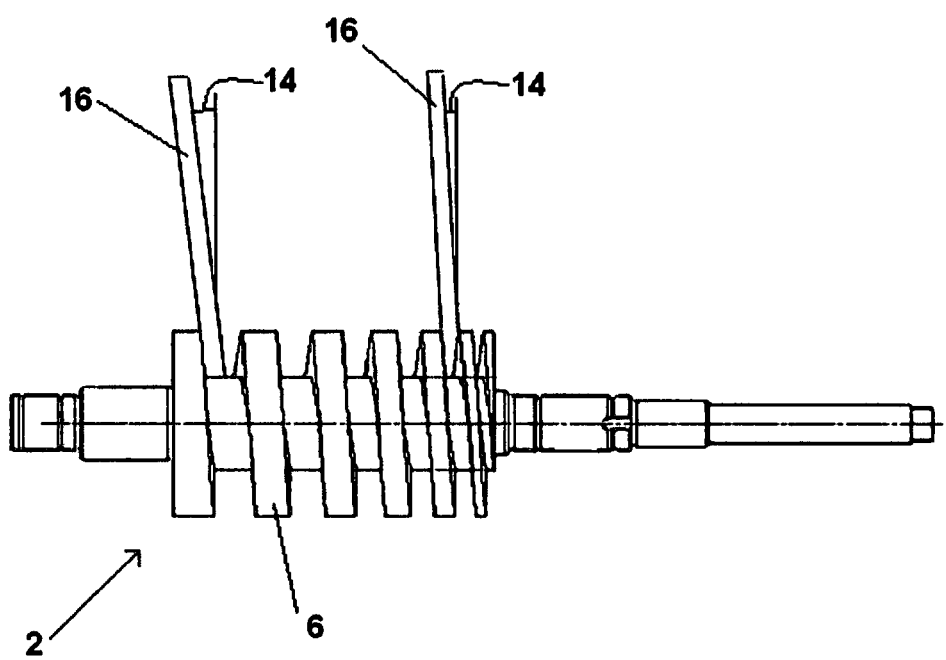
FIG. 3 is an illustrative plan view of a rotor and a cutting tool at two different spindle angles.

Throughout each pass, the value of at least one of the above machining parameters must be varied. This ensures that the lead of the helical groove produced, and therefore ultimately the lead of the thread, varies along the length of the rotor. In this embodiment, during each pass of the tool the work rotation increases. This results in increased rotation of the workpiece relative to the axial movement of the tool, decreasing the lead of the thread. This is shown in FIG. 3, where each pass of the tool 16 along the rotor 2 takes place from left to right. The variable lead could instead be provided by varying one or more other machining parameters, for instance by decreasing the axial movement of the tool during each pass. As also illustrated in FIG. 3, in this embodiment the spindle angle 14 is decreased during each pass of the tool 16. This may be preferable in some embodiments as it makes the flanks of the thread 6 steeper in order to accommodate the decrease in space between adjacent turns that is caused by the reduction in lead.

If two rotors are to be machined to have mutually complementary meshing threads, the above method may still be used to produce each rotor. However, it is frequently necessary to make one or more adjustments to one or more parameters that collectively define the relative position or relative movement of the workpiece and the grinding wheel during the machining process. As the spindle angle and work rotation (in this embodiment) are altered as the tool passes along the rotors, the profiles (i.e. cross-sectional shape in a plane normal to the axis of rotation) of the rotors vary slightly along their length. These variations can lead to regions of unsatisfactory clearance between the rotors when they are meshed. For instance, in some places along the length of the rotors (and/or at certain rotational displacements) there may be too large a gap between the rotors, allowing excessive fluid leakage, or the rotors may be too close either such that the clearance is too small or such that the rotors will collide. Adjustments are therefore necessary in order to alter the profiles of one or both of the rotors by adjusting machining parameters. This compensates for the changes made to them due to the varying lead, and ensures that the clearance between the rotors is maintained at acceptable levels.

Figure 4:
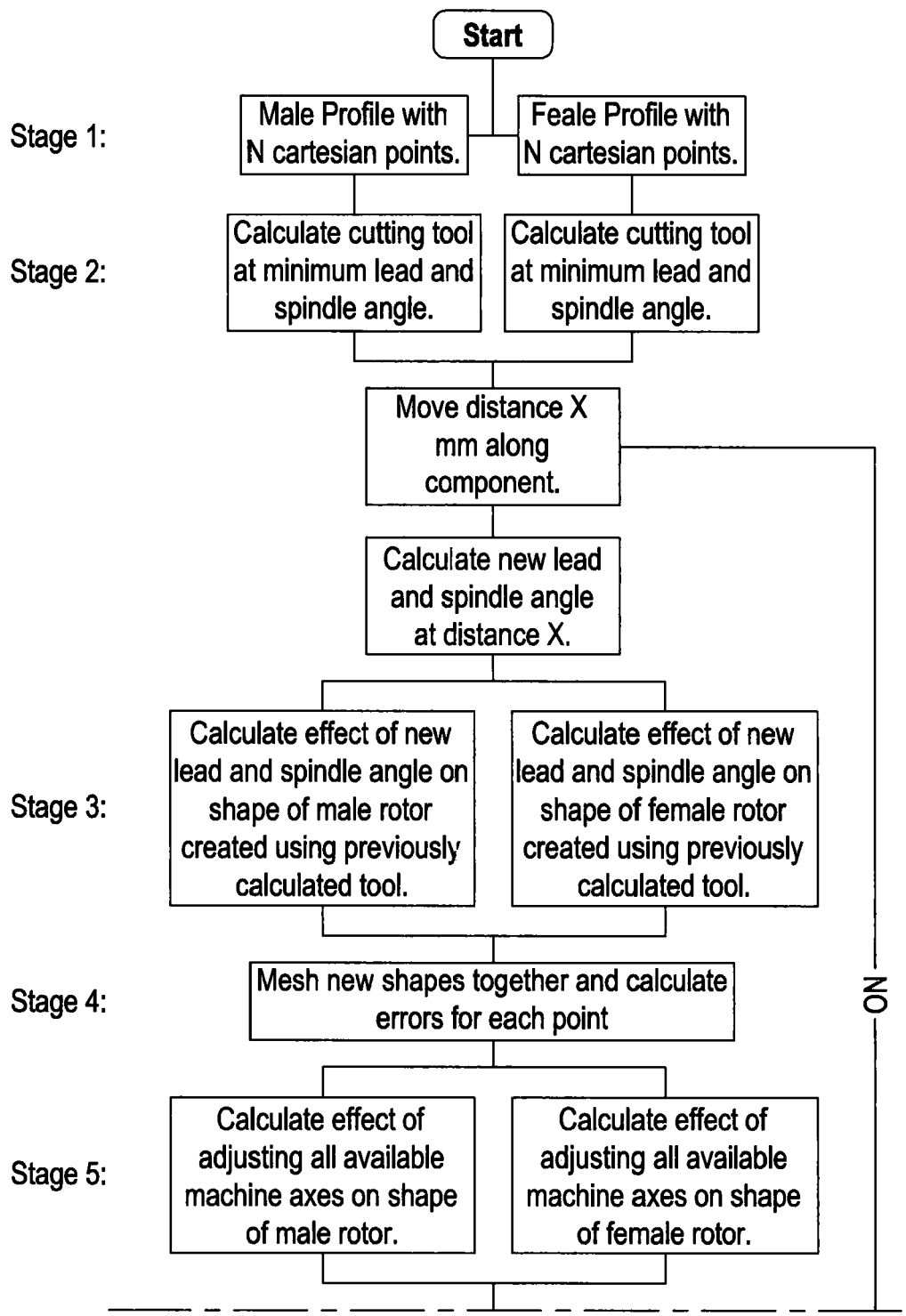
FIG. 4 is a flowchart of the procedure for calculating a parameter global adjustment distribution.
Figure 4:
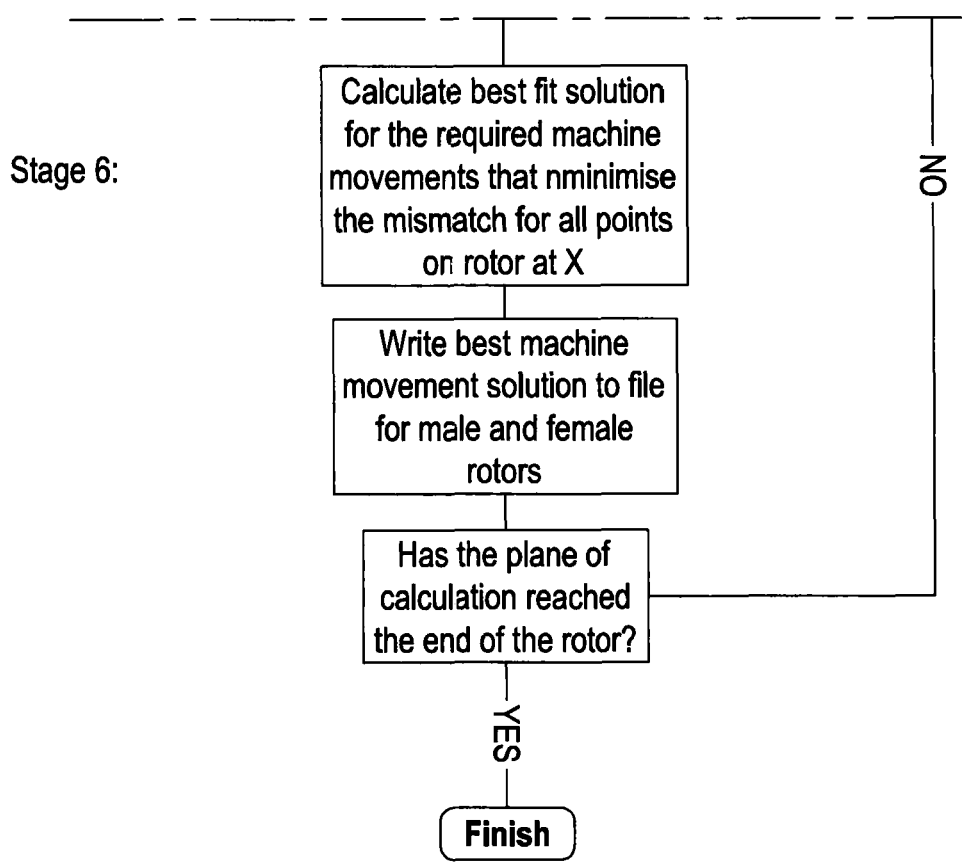

FIG. 4 is a flowchart that defines the procedure for calculating a global adjustment distribution to be utilised in the production of a pair of rotors by the above method. The global adjustment distribution defines the adjustments which must be made in order to produce rotors which exhibit acceptable clearance values at all points. This is calculated by manipulating the parameters for one or both of the pair of rotors so when they mesh together the clearance gaps at all points remain as close to the optimum as possible.

Figure 5:
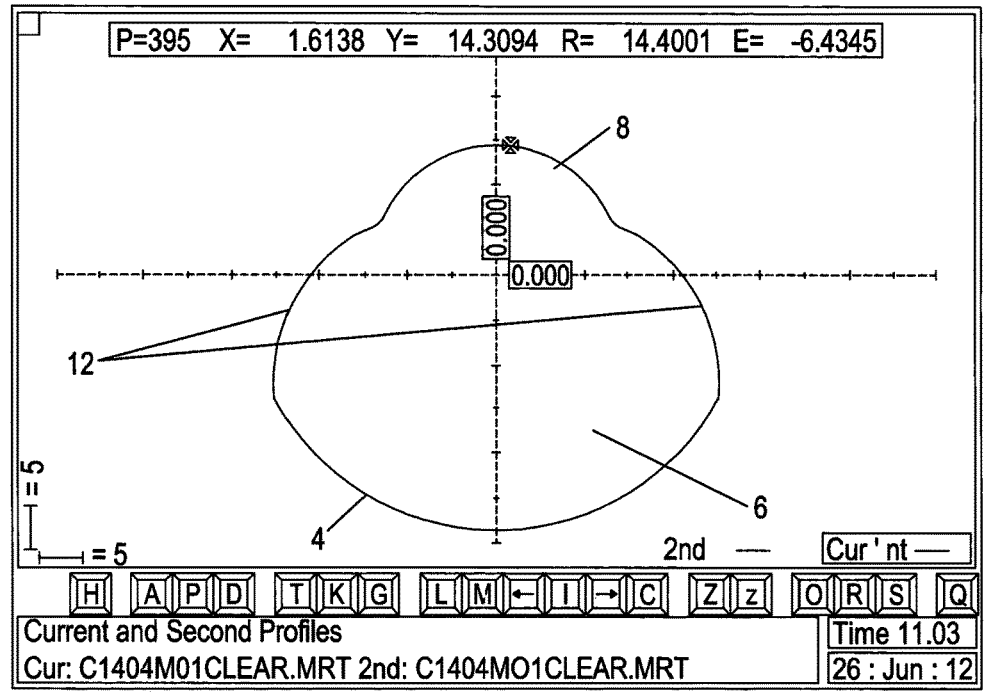
FIG. 5 is an exemplary computer-generated preliminary rotor profile.

Stage 1 of the procedure is to determine a preliminary rotor profile, i.e. cross-sectional shape in a plane normal to the axis of rotation, for the male rotor (the first rotor) and female rotor (the second rotor). In this embodiment, the preliminary rotor profiles are modelled on a computer as a set of 'N' Cartesian co-ordinates. An exemplary preliminary rotor profile is shown in FIG. 5, which shows the centre cylinder 8 of the rotor, the thread 6, the outermost surface 10 of the thread and its two flanks 12. The preliminary rotor profiles, when meshed, exhibit throughout their counter-rotation the optimal clearance, which in this embodiment is 100 μm.

As well as the preliminary rotor profile, in this embodiment a preliminary parameter variation distribution is also defined. The preliminary parameter variation distribution sets out the starting values of the parameters discussed previously, as well as setting out the variations in parameters required to produce the desired variation in screw thread lead, but does not include any adjustments to maintain the mutually complementary nature of the rotors' screw threads. For instance, an exemplary (simplified) preliminary parameter variation distribution may dictate that the starting values of the spindle angle, centre distance and work rotation are 1.5°, 300 mm and 1 RPM respectively; that the centre distance should be constant throughout; and that for every 100 mm the formed tool travels along a workpiece the spindle angle of the formed tool should increase by 1° and the speed of work rotation should decrease by 0.2 RPM.

Figure 6:
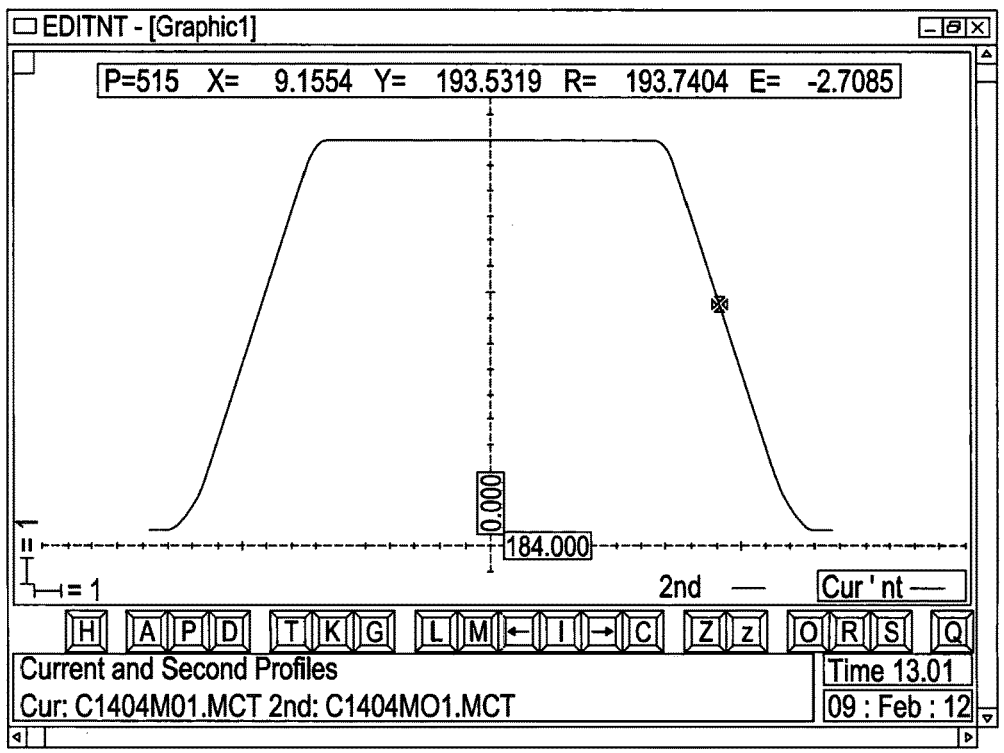
FIG. 6 is an exemplary computer-generated grinding wheel profile.

Returning to FIG. 4, stage 2 of the process is to calculate the profile of the grinding wheel (i.e. the shape of the outer periphery of the wheel) which would produce a rotor with the preliminary rotor profile if the wheel was applied to the workpiece under the starting conditions set out in the preliminary parameter variation distribution (one method suitable for this calculation is disclosed by N Stošić in 1998, in "On gearing of helical screw compressor rotors", published in Vol 212 Part C of Proc. Inst. Mech. Eng.). In this embodiment, the profile of the grinding wheel is also modelled on a computer as a set of Cartesian co-ordinates. An exemplary grinding wheel profile is shown in FIG. 6. While FIG. 4 states that the grinding wheel profile is calculated at the end of the rotor which has the smallest lead, it is equally possible that the opposite end, or an axial point between these ends, may be used as the base point for the calculation. The passes of the tool may or may not start at this axial point, and may or may not run in the same direction as the sequence of calculation.

In one embodiment the following parameters are used to calculate the cutting tool profile: the lead of the rotor's screw thread, the number of starts of the thread, the outside diameter of the rotor, the diameter of the cutting tool, the centre distance and the required profile of the thread.

As explained above, if the rotors were machined using only the above data, zones of unfavourable clearance between the rotors may be present due to subtle changes in the rotor profile caused by the variations in parameters necessary to vary the lead (i.e. the spindle angle and work rotation in this embodiment). Alterations to the profiles of the rotors must therefore be made, by making adjustments to the preliminary parameter variation distribution in order to compensate and ensure the clearance between the rotors is within acceptable bounds.

Figure 7:
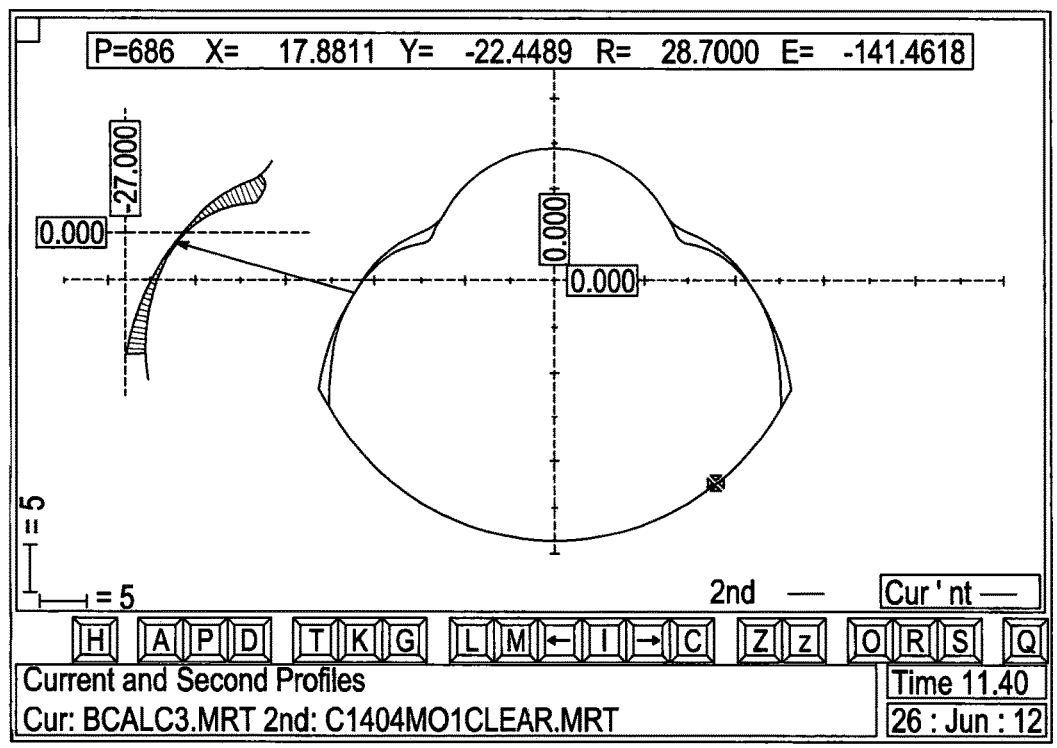
FIG. 7 is an illustrative rotor profile comparison diagram.

In stage 3 of the process, the effect of the change in spindle angle of the formed tool on the profiles of the rotors at a location X mm from the starting point of the pass is determined by calculating the rotor profiles which would be produced X mm from the start of the pass by the grinding wheel following the preliminary parameter variation distribution. FIG. 7 is an exemplary comparison of a preliminary profile and a profile produced at a point along the rotor from the starting point of the pass. The profiles are superimposed on one another and the difference highlighted. In this example, the flanks of the screw thread of the profile produced at this point along the rotor are at a steeper angle than the flanks of the thread of the preliminary profile.

Figure 8:
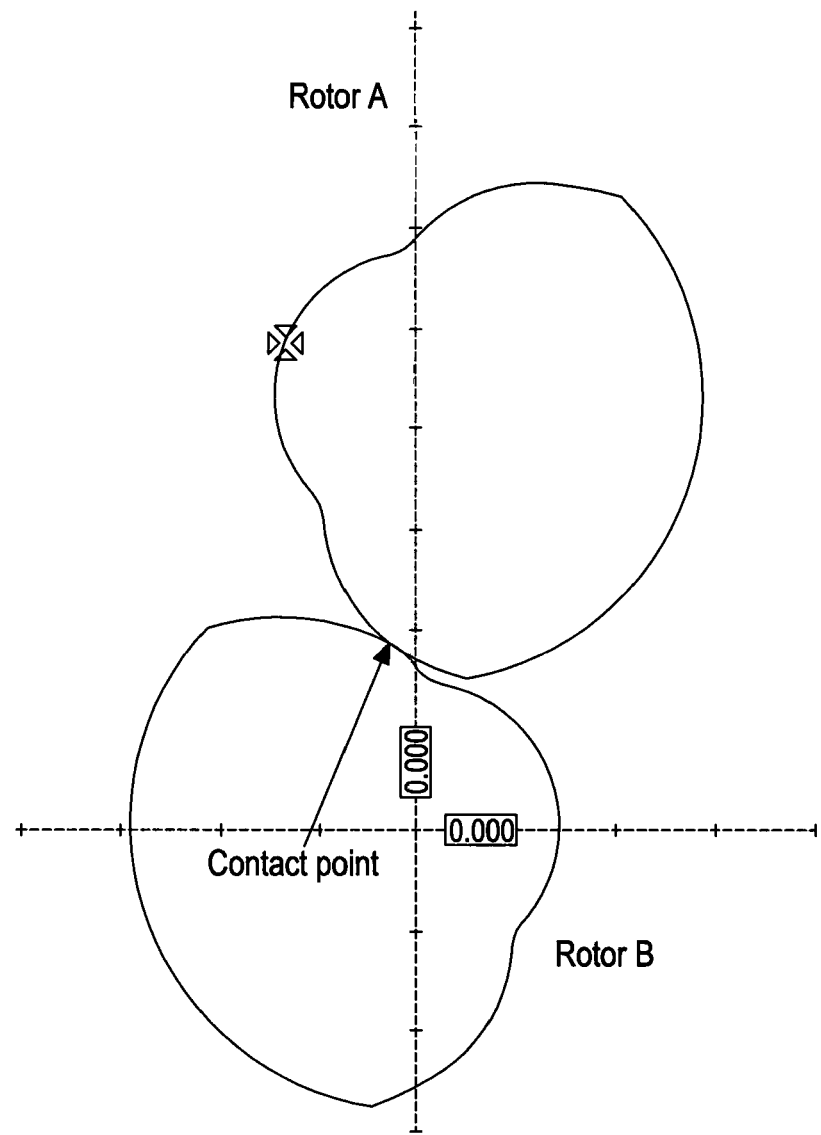
FIG. 8 is an example display of one step of a simulation used to calculate a clearance distribution.

After the above rotor profiles are produced, in stage 4 the clearance distribution that would be produced by counter rotating the rotors is calculated. The clearance distribution is the cyclic pattern of clearance values exhibited as the rotors move through one revolution (for instance, the clearance distribution may be displayed as a plot of clearance against angular displacement of the rotors). In this embodiment, the clearance distribution is calculated using the computer models of the profiles. A computer simulation is run which counter-rotates the profile models in the meshed position and records the distance between the closest Cartesian points on the two rotors at every position of rotation. After a complete rotation, the clearance distribution is produced. FIG. 8 is an example diagram showing one step in such a simulation. The closest two Cartesian points of the rotors are labelled 'contact point', however it is to be understood that there may be a clearance (i.e. a gap) between the points, or the two rotors may overlap (indicating a collision, at which point the 'closest points' are the points which penetrate furthest into the other rotor). As an illustration, at the contact point Rotor A may be 300 µm outwards from the equivalent point on the preliminary profile of that rotor, and at the contact point Rotor B may be 225 µm inwards from the equivalent point on the preliminary profile of that rotor. The clearance value is therefore 75 µm smaller than the optimal 100 µm, so the actual clearance value is 25 µm.

Figure 9:
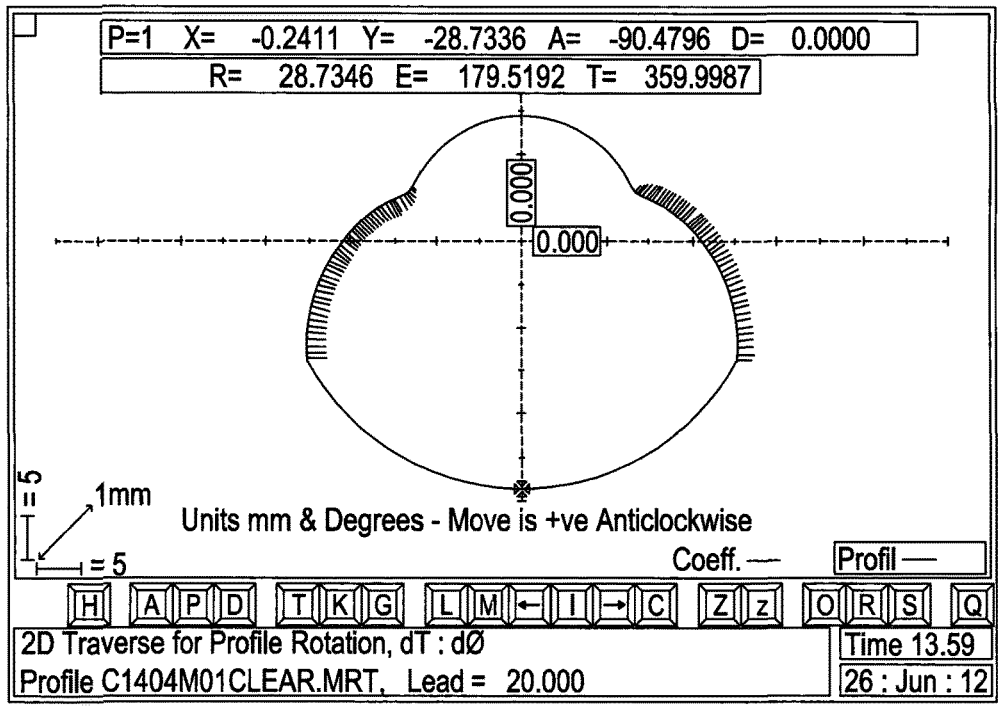
FIG. 9 is a diagram showing the effect on a rotor profile that a change in workpiece rotation may produce.
Figure 10:
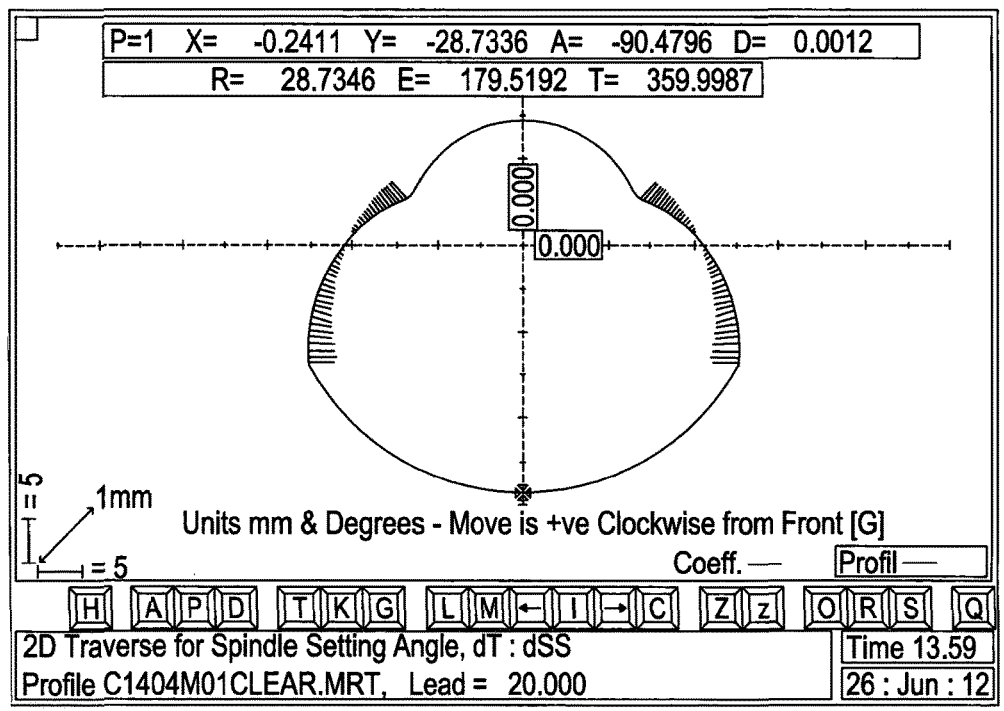
FIG. 10 is a diagram showing the effect on a rotor profile that a change in spindle angle may produce.
Figure 11:
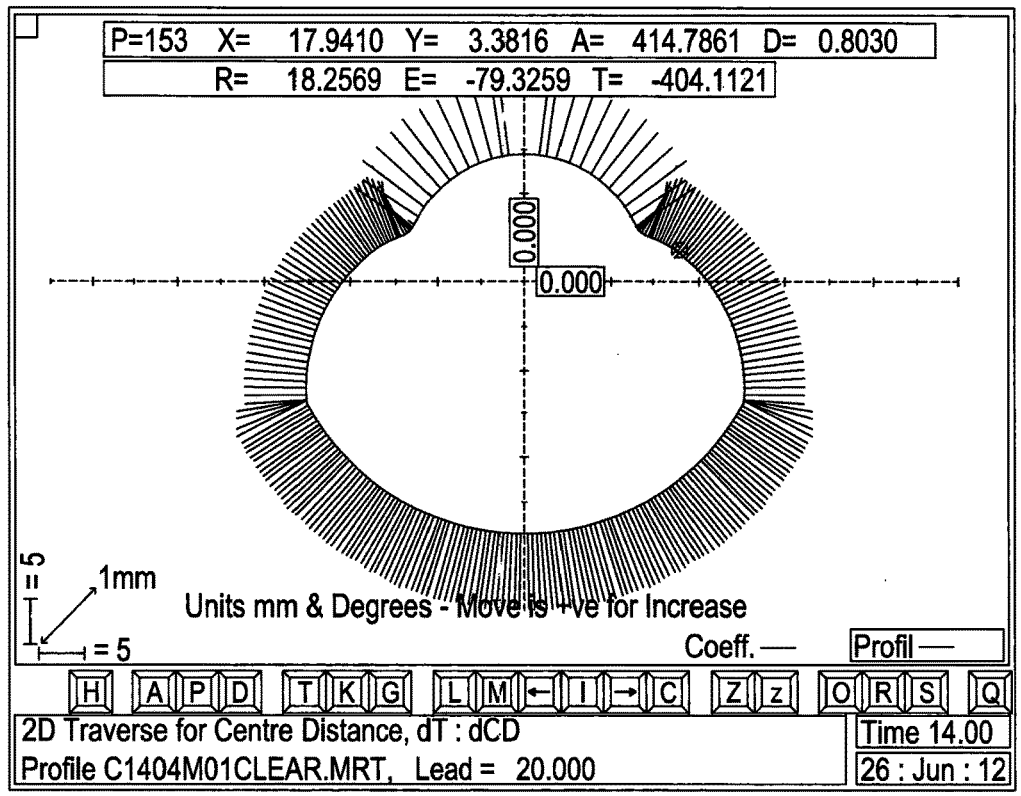
FIG. 11 is a diagram showing the effect on a rotor profile that a change in centre distance may produce.
Figure 12:
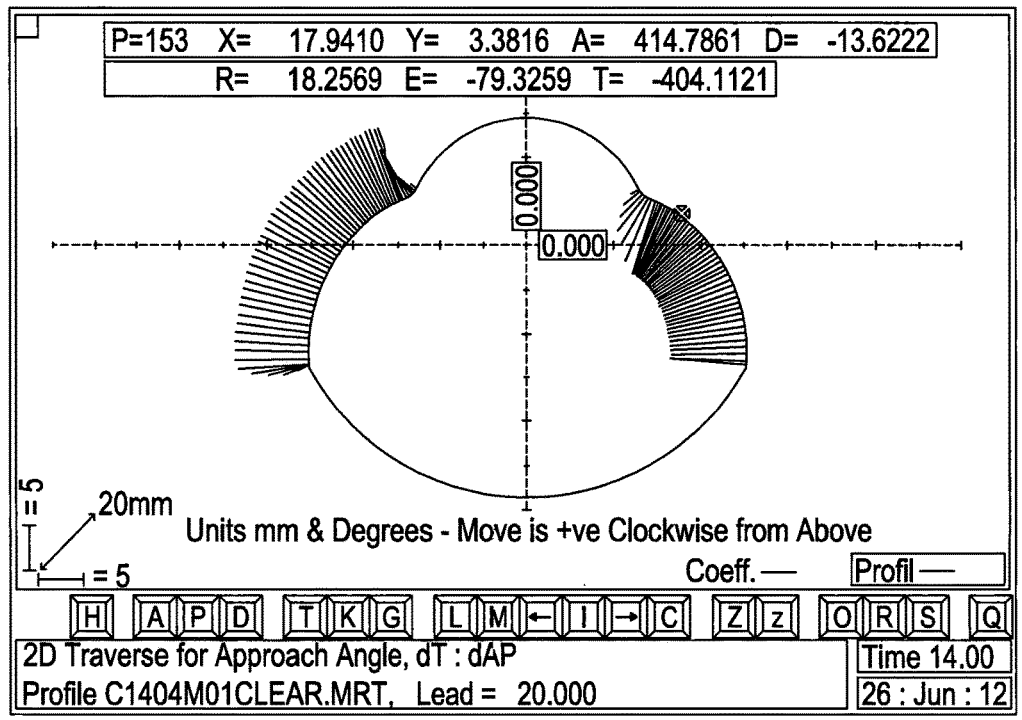
FIG. 12 is a diagram showing the effect on a rotor profile that a change in approach angle may produce.
Figure 13:
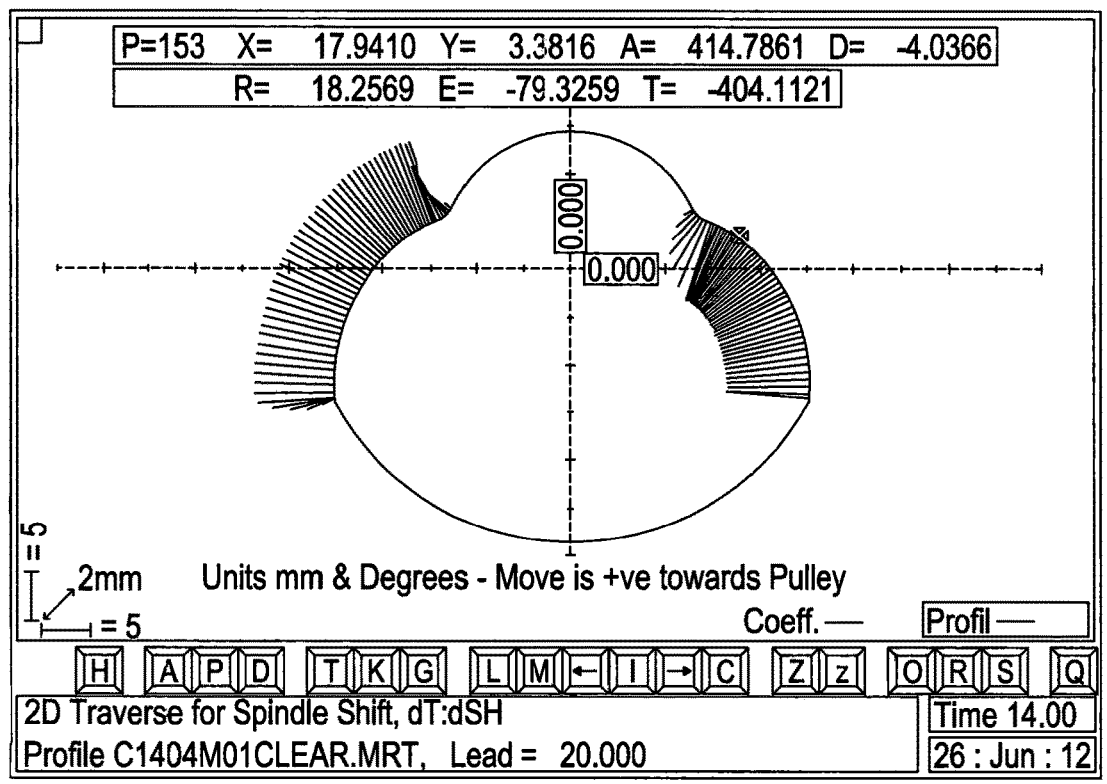
FIG. 13 is a diagram showing the effect on a rotor profile that a change in axial movement may produce.

In stage 5, the effect on the profiles (and therefore the clearance distribution) of an adjustment to each considered parameter is calculated. In this embodiment each calculation is performed by making the necessary changes to the computer model of the profile in order to create the effect of an arbitrary change in a parameter. For example FIG. 9 shows an illustrative diagram of the effect on the profile of one rotor that an arbitrary change in the speed of work rotation may produce, and FIG. 10 shows an illustrative diagram of the effect on the profile of that rotor that an arbitrary change in the spindle angle of the grinding wheel may produce. In both diagrams the lines perpendicular to the outline of the profile indicate the direction and relative magnitude of the change in the shape of the profile (the lines are not to scale with the trace of the profile itself). Further illustrative diagrams showing one possible effect on a profile of adjustments to other variables are presented in FIGS. 11-13, which show an effect that may be produced by an arbitrary change in centre distance, approach angle and axial movement respectively.

Figure 14:
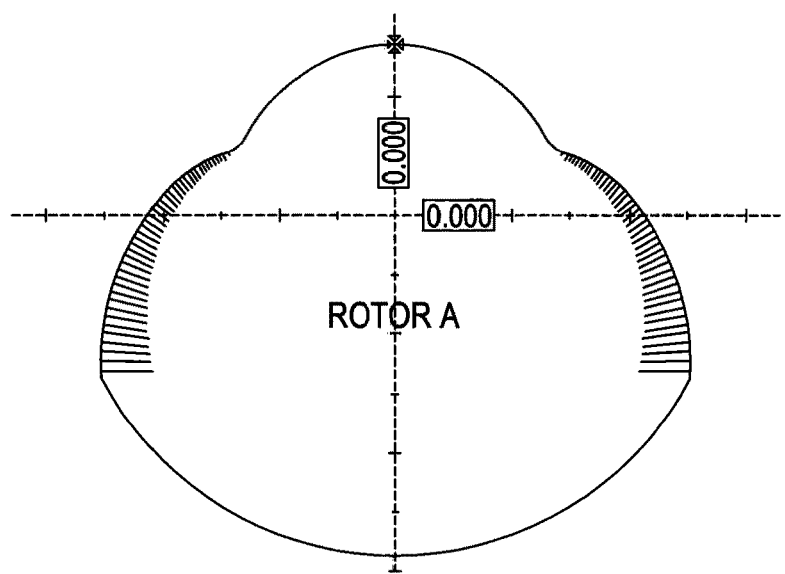
FIG. 14 is a diagram showing one possible desired change in a rotor profile.

Once the effects of adjustments to all considered parameters have been calculated for both rotors, a location-specific adjustment set is compiled in stage 6. The location-specific adjustment set is a set of parameter adjustments which, if added to the preliminary parameter variation distributions, would cause the clearance distribution between the rotors at that axial location to remain within acceptable bounds. In this exemplary embodiment the acceptable bounds are 100±10 µm. By way of an example, if the change in the profile of Rotor A required to maintain the clearance distribution between it and Rotor B within acceptable bounds is shown in FIG. 14, in relation to the left flank (i.e. the flank shown to the left of FIG. 14) this can be achieved by making the adjustments to the work rotation and spindle angle illustrated in FIGS. 9 and 10 respectively. In relation to the right flank this can be achieved by making the adjustment to the spindle angle shown in FIG. 10 and an adjustment to the work rotation in the opposite direction to that shown in FIG. 9 (presuming that both flanks are not machined simultaneously, at which point altering the work rotation differently for each flank would not be possible and different adjustments would have to be made). In this case the magnitudes of the adjustments that are necessary to adjust the profile suitably appear to be the same as the magnitudes illustrated, however in other embodiments the magnitudes of the adjustments may differ from the magnitude of their respective arbitrary changes. Similarly, in this example this location-specific adjustment set only includes adjustments to one of the rotors at this point, but in other situations adjustments (whether to the same parameter or a different parameter) may be applied to both rotors. In summary, in this example the location-specific adjustment set for the location X mm along the two workpieces contains an adjustment of the work rotation and an adjustment of the spindle angle for Rotor A, and no adjustments for Rotor B.

After the location-specific adjustment set for the position X mm along the workpieces has been calculated (and recorded), the process of stages 3 to 6 is repeated at other locations along the axial lengths of the workpieces. In the exemplary embodiment of FIG. 4 the process is repeated at intervals of X mm. This process continues until the far end of the rotor has been reached, at which stage a group of location-specific adjustment sets, one for each point along the workpieces at which stages 3-6 were performed, has been collected. In this embodiment, owing to consistent incremental selection, the locations are evenly distributed along the length of the rotors (the value of X having been calculated so that the final location is exactly at the far end of the rotors to the ends at which the passes of the formed tool commence).

Once all the location-specific adjustment sets have been calculated, for each parameter the adjustments required between the calculated locations are interpolated from the adjustments to that parameter according to the parameter adjustment sets. All the adjustments for all the parameters are then collated to form the global adjustment distribution. The global adjustment distribution is then split up into the adjustments required during the manufacture of each rotor. In addition, in embodiments where two or more flanks of the thread are machined in separate passes or sets of passes, the global adjustment distribution is then separated into the portions of the global adjustment distribution that are applicable to each flank.

By way of clarification, the nature of the global adjustment distribution may be considered to be a collection of plots for each parameter, each plot comprising magnitude of adjustment against distance along the rotor. For example, an exemplary (simplified) global adjustment distribution for one rotor may dictate that the spindle angle should decrease by 0.1° for every 100 mm the tool travels along the workpiece until the tool reaches 270 mm along the workpiece, after which the spingle angle should increase by 0.2°; and that the centre distance should increase by 1 mm for every 100 mm traveled by the tool throughout the pass.

The movements to be followed by a grinding machine to manufacture the rotors are determined by superimposing the global adjustment distribution on top of the preliminary parameter variation distribution for each rotor. For instance if the preliminary parameter variation distribution dictates that at a certain point on a rotor the centre distance should be 300 mm and the global adjustment distribution dictates that a decrease of 2 mm is required at that point, the centre distance the machine will provide at that point will be 298 mm.

By way of a more detailed illustration, if a rotor was manufactured according to the exemplary preliminary parameter variation distribution discussed previously, and the required adjustments are set out by the exemplary global adjustment distribution given above, the movements to be followed by a grinding machine would be as follows:
 a) starting at 1.5°, for every 100 mm the tool travels along a workpiece the spindle angle should increase by 0.9° until the tool has passed 270 mm along the workpiece, after which the spindle angle should increase by 1.2° for every further 100 mm traveled;
 b) starting at 300 mm, the centre distance should decrease by 1 mm for every 100 mm traveled by the tool; and
 c) starting at 1 RPM, the speed of workpiece rotation should decrease by 0.2 RPM for every 100 mm the tool travels along the workpiece.

As demonstrated above, in this embodiment the parameter adjustments are calculated simultaneously for a pair of rotors. An exemplary corresponding set of movements to be followed by a grinding machine when producing a complementarily shaped rotor may be:
 a) starting at 2.5°, the spindle angle for every 100 mm the tool travels along a workpiece should increase by 0.75° until the tool has passed 180 mm along the workpiece, after which the spindle angle should increase by 0.9° for every further 100 mm traveled.
 b) starting at 300 mm, the centre distance should decrease by 0.5 mm for every 100 mm traveled by the tool.
 c) starting at 1.5 RPM, the speed of workpiece rotation should decrease by 0.3 RPM for every 100 mm the tool travels along the workpiece.

As this example shows, the adjustments applied to the machining of each rotor may be of differing magnitudes and/or take place at different axial positions. Furthermore, in further examples different parameters may be adjusted for the machining of each rotor, or only the parameters for machining one of the rotors may be adjusted at all.

It will be appreciated that numerous modifications to the above described design may be made without departing from the scope of the invention as defined by the appended claims. For instance, while in the described embodiment many calculations and derivations are performed using manipulation of a computer model, one or more of them may instead be performed entirely numerically or graphically. Instead, the calculations and derivations or the entire method may be implemented by running a computer program. The computer program may be carried on a computer readable media which may be tangible carrier media (e.g. disks) or intangible carrier media (e.g. communications signals), and/or may be implemented using suitable apparatus which may include a programmable computer connected to or forming part of a machining apparatus.

In addition, instead of being a grinding wheel the formed tool may be any other suitable type of formed tool such as a milling cutter or a spark-eroding tool. Furthermore, though the calculations in the above embodiment were performed iteratively by modelling the profiles at one location at a time, in other embodiments the entire rotors may be modelled first, before performing all the necessary calculations (either simultaneously, or one location at a time).

The described and illustrated embodiment is to be considered as illustrative and not restrictive in character, it being understood that only a preferred embodiment has been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

Optional and/or preferred features as set out herein may be used either individually or in combination with each other where appropriate and particularly in the combinations as set out in the accompanying claims. The optional and/or preferred features for each aspect of the invention set out herein are also applicable to any other aspects of the invention, where appropriate.

For the avoidance of doubt, reference to movement of the tool herein is intended to cover any form of relative movement between the tool and workpiece. For instance, a pass of the tool may in fact be provided by moving the workpiece along an axially fixed tool, or a change in spindle angle may be created by altering the angle of the axes of both the tool and the workpiece.

The invention claimed is:

1. A method of machining a first rotor and a second rotor, with a formed tool, wherein the formed tool has a specific shape to impart a specific profile, wherein the first rotor and the second rotor have mutually complementary meshing threads, the first rotor being made from a first workpiece, the second rotor being made of a second workpiece, the method comprising:

rotating the first workpiece about a longitudinal axis of the first workpiece;

making one or more passes of the formed tool along the longitudinal axis of the first workpiece as the workpiece rotates so as to remove material to create the specific profile imparted by the specific shape of the formed tool to form the first rotor, thereby forming the flanks of each helix of the first rotor's thread, the value of at least one of the parameters that collectively define the relative position and relative movement of the first workpiece and formed tool being varied during each pass so as to vary the lead of the thread; and repeating the above steps for the second workpiece, thereby forming the second rotor, wherein adjustments are made to at least one of said parameters during one or more of the passes in order to maintain mutually complementary shapes of the threads of the rotors;

wherein the adjustments made during each pass are made according to a global adjustment distribution, each global adjustment distribution being determined in advance by:

theoretically calculating a clearance distribution that would e produced by counter-rotating a hypothetical pair of meshed first and second rotors of the shape that would be produced by machining them without any adjustments being made, at a plurality of locations along the longitudinal axes of the meshed rotors;

deriving a location-specific adjustment set for each of said locations, each location-specific adjustment set comprising one or more parameter adjustments which would cause the clearance distribution at that location to be maintained within a predetermined range of values; and collating the adjustments to each parameter according to the location-specific adjustment sets.

2. The method according to claim 1 wherein said adjustments include one or more adjustments to the speed of rotation of the workpiece.

3. The method according to claim 1 wherein said adjustments include one or more adjustments to the spindle angle of the formed tool.

4. The method according to claim 1 wherein said adjustments include one or more adjustments to the centre distance between the workpiece and the formed tool.

5. The method according claim 1 wherein said adjustments include one or more adjustments to the approach angle of the formed tool.

6. The method according to claim 1 wherein said adjustments include one or more adjustments to the axial position of the formed tool in a direction along its rotational axis.

7. The method according to claim 1 wherein the collated adjustments include adjustments interpolated at points between said locations.

8. The method according to claim 1 wherein each location-specific adjustment set is derived by:

determining the effect that an arbitrary adjustment of each parameter individually would have on the clearance distribution at that location; and determining a combination of adjustments, and the necessary magnitudes of those adjustments, which would maintain the clearance distribution within a predetermined range of values.

9. The method according to claim 1 wherein said locations are distributed at substantially regular intervals along the portions of the rotors that mesh with each other.

10. The method according to claim 1 wherein the global adjustment distribution is calculated using a computerised model of the hypothetical rotors of the shape that would be produced by machining them using the method of claim 1 but without any adjustments being made.

11. The method according to claim 10 wherein the location-specific adjustment sets are calculated by manipulating said computerised model.

12. The method according to claim 1 wherein the formed tool comprises at least one of a grinding wheel and a milling wheel.

13. A method of producing a rotor with variable-lead screw by machining a workpiece using a formed tool, wherein the formed tool has a specific shape to impart a specific profile, the method comprising:

rotating the workpiece about a longitudinal axis of the workpiece; and making at least one pass of the formed tool along the longitudinal axis of the workpiece as the workpiece rotates so as to remove material, each pass forming at least one flank of at least one helix of the rotor's thread, the value of at least one of the parameters that collectively define the relative position and relative movement of the workpiece and formed tool being varied during each pass so as to vary the lead of the thread produced by the at least one pass;

wherein during each pass adjustments are made according to a global adjustment distribution, each global adjustment distribution being determined in advance by;

theoretically calculating a clearance distribution that would be produced by counter-rotating a hypothetical pair of meshed first and second rotors of the shape that would be produced by machining them without any adjustments being made, at a plurality of locations along the longitudinal axes of the meshed rotors;

deriving a location-specific adjustment set for each of said locations, each location-specific adjustment set comprising one or more parameter adjustments which would cause the clearance distribution at that location to be maintained within a predetermined range of values; and collating the adjustments to each parameter according to the location-specific adjustment sets.

14. The method according to claim 13 wherein the formed tool comprises at least one of a grinding wheel and a milling wheel.

* * * * *